Aug. 21, 1934.　　　C. H. WILLS ET AL　　　1,970,928
ROTARY VALVE
Filed Feb. 23, 1932　　　2 Sheets-Sheet 1
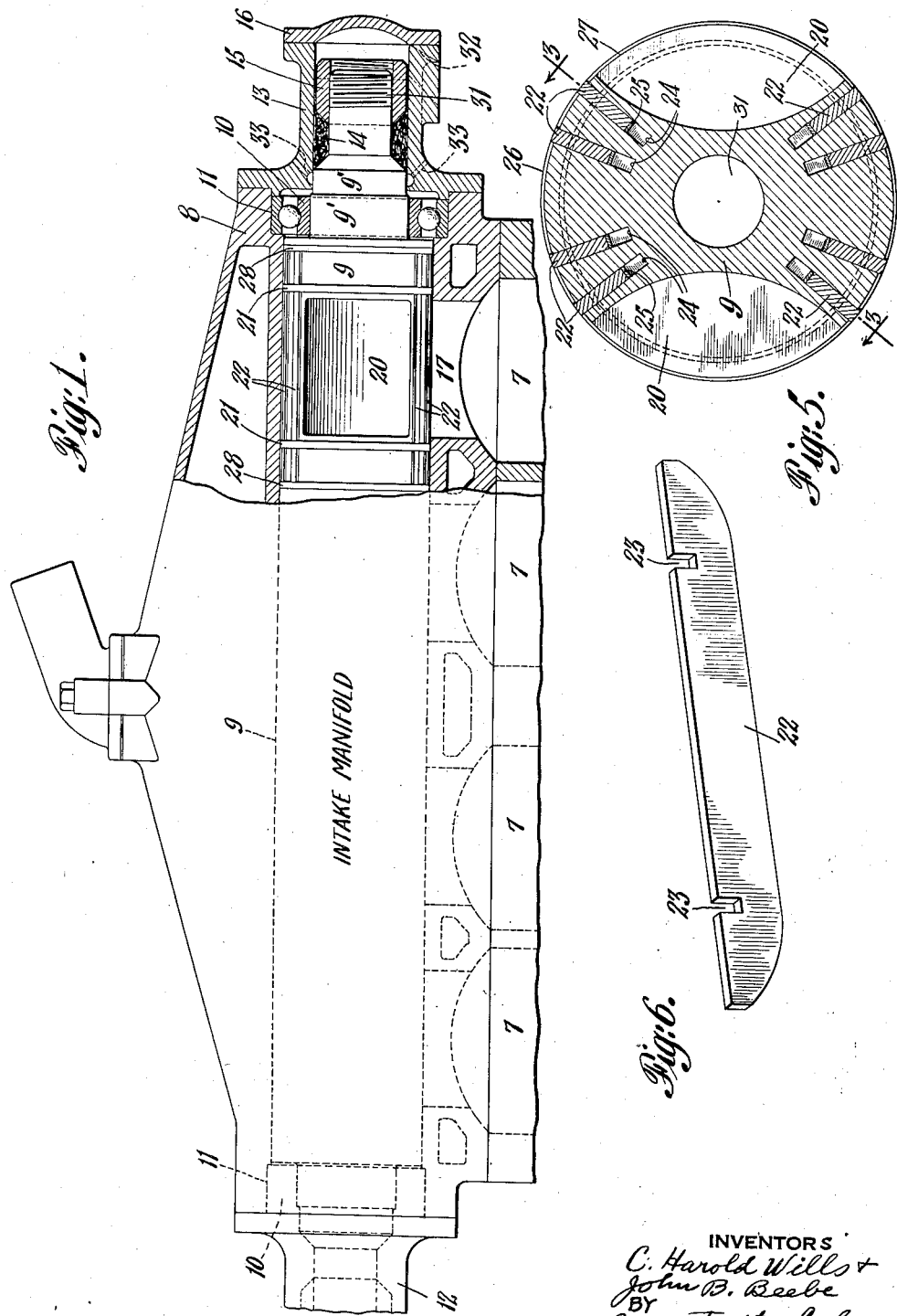
INVENTORS
C. Harold Wills &
John B. Beebe
BY
Synnestvedt & Lechner
ATTORNEYS Aug. 21, 1934.    C. H. WILLS ET AL    1,970,928
ROTARY VALVE
Filed Feb. 23, 1932    2 Sheets-Sheet 2
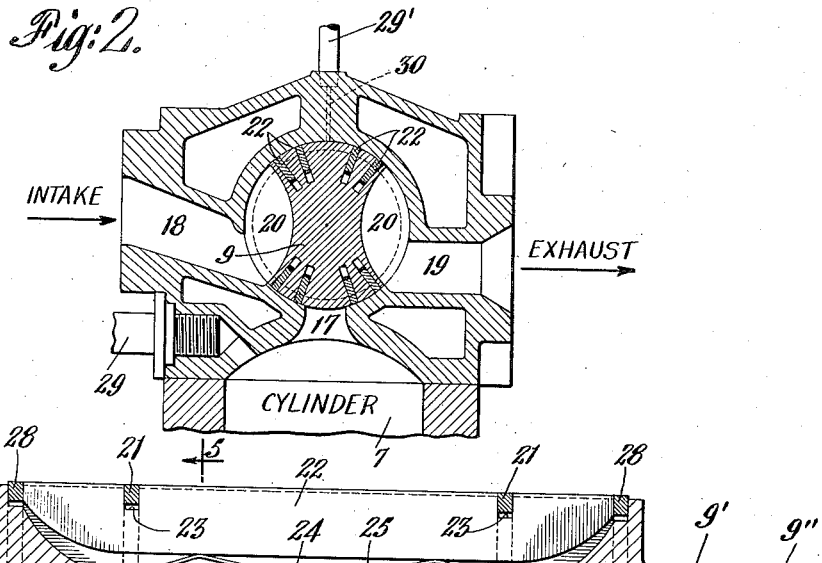
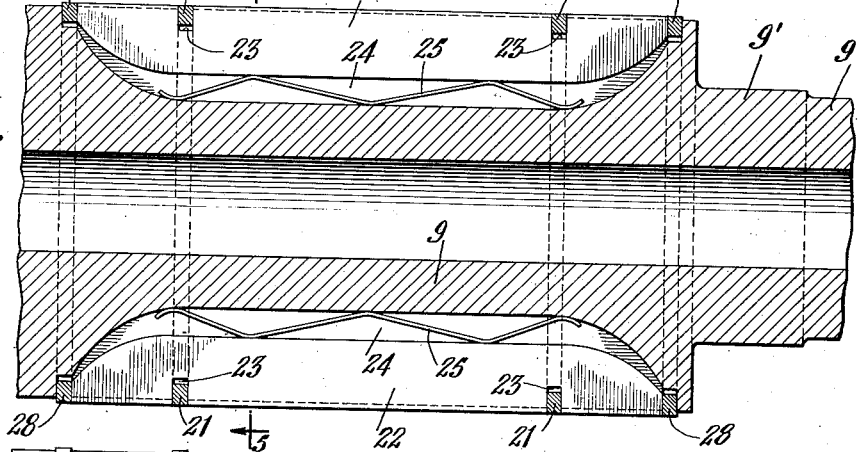
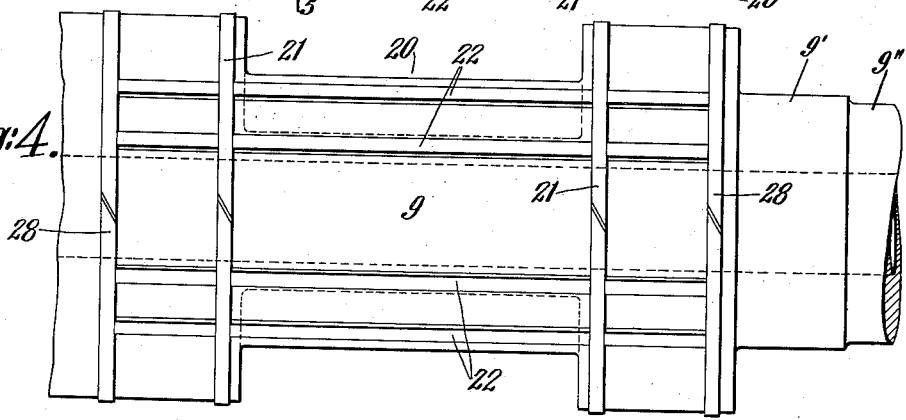

Patented Aug. 21, 1934

1,970,928

UNITED STATES PATENT OFFICE 1,970,928

ROTARY VALVE

Child Harold Wills, Marysville, and John Buttler Beebe, Port Huron, Mich., assignors, by mesne assignments, to Mary C. Wills, Grosse Pointe Farms, Mich.

Application February 23, 1932, Serial No. 594,588

4 Claims. (Cl. 123—59)

This invention relates to rotary valves and is especially useful for internal explosion engines in connection with which it will be described.

Rotary valves have frequently been purposed for internal explosion engines, but difficulty has been encountered in their operation, particularly from heating and consequent warping, and from unbalanced forces.

One of the primary objects of our invention is to provide a rotary valve which overcomes the foregoing objections and which otherwise secures all of the advantages known to be incident to the rotary type of valve.

More particularly we propose to provide what may be termed a floating rotary valve which may be lubricated as by the incoming and/or outgoing mixture, and in which provision is made to balance the valve under all conditions of operation.

We also aim to provide a valve which is easy to assemble and which has long life.

The foregoing, together with such other objects and advantages as appear hereinafter, or are incident to our invention, we realize by a construction illustrated in the preferred form in the accompanying drawings, wherein—

Fig. 1 is a fragmentary side elevation and partial section illustrating our improvements.

Fig. 2 is a cross sectional view through the improved valve and the upper end of a cylinder.

Fig. 3 is an enlarged sectional view of a part of the valve, taken on the line 3—3 of Fig. 5.

Fig. 4 is a side elevation of Fig. 3.

Fig. 5 is a section taken on the line 5—5 of Fig. 3, and

Fig. 6 is a perspective of a detail of the invention.

In Fig. 1 we have illustrated the invention as applied to a four cylinder engine of the four cycle type, the upper ends of the cylinders being indicated at 7. Mounted on the cylinders is a casing 8 which serves as a head for the cylinders and a housing for the rotor 9. The casing 8 is water cooled.

The rotor has clearance in the bore of the casing and has reduced end portions 9' to receive the bearings 10 fitted into opposite ends of the casing 8, in bores 11 larger than the main bore. The open ends of the casing 8 are closed by caps 12 and 13. The bore of the cap 13 is smaller in diameter than the portion 9' of the rotor and the rotor has a reduced end portion 9'' fitting said bore. A packing 14 is provided for the end of the bore. A packing 14 is provided for the end of the bore. The end plate 16 of the cap 13 may be removed.

The construction is substantially the same at the other end of the rotor, save that there is provision made for driving the rotor from the motor in any well known manner.

By removing the members at one end, preferably the left hand end, the rotor with its packing and packing nuts may be removed as an entirety.

Opening from the lower portion of the bore of the casing are slots 17, one for each cylinder, by means of which the mixture is admitted and the expended charge exhausted, as will further appear. Inlet ports 18, one for each cylinder, are also provided in the casing leading from one face to the bore. On the opposite side, the casing is provided with exhaust ports 19 leading from the bore to the other face. The intake and exhaust manifolds are secured to opposite sides of the casing.

The rotor is provided with port cavities along its length preferably in pairs, a pair for each cylinder. These cavities are indicated at 20. As the valve is rotated these cavities provide communication between the intake ports and the cylinders and the exhaust ports and the cylinders. The pairs of ports are offset 90° in the order of firing.

In the position of the rotor shown in Fig. 2 the piston for the respective cylinder is at compression approximately ready for explosion of the charge. The ports 18 and 19 are closed and the port 19 will be uncovered after the explosion stroke, whereupon the expended charge will exhaust. When this has taken place the port cavity through which exhaust took place will be the cavity through which the next charge for that cylinder is being drawn and the other port cavity—which was utilized for the entrance of the previous charge—will connect exhaust port 19 for discharge. Thus the surfaces subjected to heat are immediately thereafter subjected to the cooling influence of the gaseous mixture.

In order that the rotor may have substantial clearance in the bore of the casing, and in order that it may be balanced, the following provision is made, attention being directed particularly to Figures 3, 4 and 5. Adjacent the ends of each pair of cavities the rotor is provided with a packing ring 21 of any preferred construction. The rotor is also provided with eight bars (or longitudinal rings as they may be termed) 22 for each pair of cavities. These have slots 23 milled therein to receive the rings 21. The rotor body has slots 24 milled therein to receive the bars 22, these slots being of sufficient depth to permit the bars 22 to be radially inwardly depressed sufficient to permit the rings 21 to be slipped thereover into place. Springs 25 serve to hold the bars 22 outwardly, compressing them against the face of the bore. The spring of the ring 21 holds them against the face of the bore. Centrifugal force also aids in holding the bars 22 against the face of the bore.

Thus the intersecting rings provide an uninterrupted sealing wall around each cavity and around the body portions of the rotor intermediate the cavities, peripherally of the rotor. Stated in other words, the intersecting rings, the body of the rotor and the housing provide chambers 26 and chambers 27, the chambers 27 surrounding the port cavities and the chambers 26 surrounding the body of the rotor intermediate the port cavities.

The ends of the bars 22 fit against the rings 28 for the reception of which the body of the rotor has annular grooves milled therein, adjacent the ends of the slots 24.

By the above arrangement it will be seen, for example, that when one of the ports 20 is connecting ports 18 and 17, the incoming mixture is sealed off and prevented from flowing around the rotor body to the exhaust port, and similarly when one of the ports 20 is connecting the ports 19 and 17, the exhaust is sealed off and cannot flow around the rotor body. The arrangement also permits of balancing the valve. Thus, for example, with the rotor in the position of Figure 2 with the cylinder on compression the charge under compression cannot escape backwards around the body. In this position the opposite chamber 26 will be at the top and the by-pass 29 to 29' establishes communication between the top of the cylinder and the said chamber 26, for which purpose the casing has a port 30 opening to the bore, drilled therein. Thus the compression pressure of the cylinder is transmitted to the top of the rotor body holding the rotor in balance. Similarly if the piston for the respective cylinder is on suction stroke, suction is effective upon the top of the rotor body by means of the by-pass; and thus for all conditions of operation.

The rotor is, therefore, always in balance.

It will be understood that the same provision of rings is made for the rotor for each cylinder of the engine.

It will be seen from the foregoing that the arrangement is one in which the valve body does not normally contact with the face of the bore, the rings making the contact. This obviates the warping and consequent binding difficulties heretofore encountered with valves of the rotary type. We have found that no special lubrication is required, the incoming charge serving sufficiently for this purpose. No objectionable wearing of grooves in the bore occurs. In fact, we have operated motors so equipped and found after a great many thousands of miles, that the valve is still in perfect operating condition.

If desired the rotor may also be internally cooled for which purpose we provide the bore 31 and introduce cooling water or other medium through the ports 32 in the end caps. Circulation thus takes place through the rotor body. To prevent the cooling medium from working into the interior of the main bore, leak-off ports 33 may be provided intermediate the bearings and the packing. By slightly scoring or scratching the face of the gland nut which bears against the packing, we have found that any liquid working past is thrown or drawn back and put into the general circulation. This cooling and the cooling of the cavity surfaces hereinbefore referred to, because they tend to prevent overheating of the valve, also assist in minimizing warping, and thus reduce the clearance needed between the rotor and the bore.

The device is easy to assemble.

Eight bars 22 are preferably employed to secure sealing at all positions of the rotor. It is obvious that the arrangement may be reversed and the bars carried in the housing instead of on the rotor.

We claim:—

1. In an internal combustion engine, the combination with an engine cylinder, a rotary valve, a housing for the valve having a port communicating with the cylinder and having an inlet port and an exhaust port disposed oppositely to one another, the valve having a cutaway portion on each side providing oppositely disposed cavities adapted to establish communication alternately between said first port and the inlet port and said first port and the exhaust port, annular and longitudinal packing members cooperating to provide sealing walls entirely marginally surrounding each cavity and entirely marginally surrounding chambers circumferentially of the valve between the cavities thereof, and longitudinal packing members subdividing said chambers into a plurality of chambers.

2. In an internal combustion engine, the combination with an engine cylinder, a rotary valve, a housing for the valve having a port communicating with the cylinder and having an inlet port and an exhaust port disposed oppositely to one another, the valve having a cutaway portion on each side providing oppositely disposed cavities adapted to establish communication alternately between said first port and the inlet port and said first port and the exhaust port, and annular and longitudinal packing members cooperating to provide sealing walls entirely marginally surrounding each cavity and entirely marginally surrounding chambers circumferentially of the valve between the cavities thereof, there being a pair of spaced annular members to either end of each cavity and a pair of spaced longitudinal members to either side of each cavity.

3. In an internal combustion engine, the combination with an engine cylinder, a rotary valve, a housing for the valve having a port communicating with the cylinder and having an inlet and an exhaust port disposed oppositely to one another, the valve having a cutaway portion on each side providing oppositely disposed cavities arranged to establish communication alternately between said first port and the inlet port and said first port and the exhaust port, annular and longitudinal packing members cooperating to provide sealing walls entirely marginally surrounding each cavity, and other longitudinal packing members in the portion of the valve between the cavities, said other members being circumferentially spaced from each other and from the first mentioned longitudinal packing members to provide sealing walls entirely marginally surrounding a plurality of chambers circumferentially of the valve at the portion between the cavites.

4. In an internal combustion engine, the combination with an engine cylinder, a rotary valve, a housing for the valve having a port communicating with the cylinder and having an inlet port and an exhaust port disposed oppositely to one another, the valve having a cutaway portion on each side providing oppositely disposed cavities adapted to establish communication alternately between said first port and the inlet port and said first port and the exhaust port, and annular and longitudinal packing members cooperating to provide sealing walls entirely marginally surrounding each cavity and entirely marginally surrounding chambers circumferentially of the valve between the cavities thereof, there being a pair of spaced annular members to either end of each cavity and a pair of spaced longitudinal members to either side of each cavity, said longitudinal members being continuous from one end annular member to the other end annular member and being slotted to receive the intermediate annular members, and a single spring associated with each longitudinal member to urge it outwardly.

CHILD HAROLD WILLS.
JOHN BUTTLER BEEBE.